United States Patent
Gupta et al.

(10) Patent No.: US 11,832,035 B2
(45) Date of Patent: Nov. 28, 2023

(54) LOCALIZED NOC SWITCHING INTERCONNECT FOR HIGH BANDWIDTH INTERFACES

(71) Applicant: XILINX, INC., San Jose, CA (US)

(72) Inventors: Aman Gupta, Sunnyvale, CA (US);
Sagheer Ahmad, Cupertino, CA (US);
Ygal Arbel, Morgan Hill, CA (US);
Abbas Morshed, Los Altos, CA (US);
Eun Mi Kim, San Jose, CA (US)

(73) Assignee: XILINX, INC., San Jose, CA (US)

( * ) Notice: Subject to any disclaimer, the term of this patent is extended or adjusted under 35 U.S.C. 154(b) by 415 days.

(21) Appl. No.: 17/232,207

(22) Filed: Apr. 16, 2021

(65) Prior Publication Data

US 2022/0337923 A1    Oct. 20, 2022

(51) Int. Cl.
*H04Q 3/00* (2006.01)
*G06F 13/16* (2006.01)
*G06F 13/40* (2006.01)

(52) U.S. Cl.
CPC ....... *H04Q 3/0004* (2013.01); *G06F 13/1668* (2013.01); *G06F 13/4027* (2013.01)

(58) Field of Classification Search
CPC ......... H04Q 3/0004; H04Q 2011/0058; H04Q 2213/1304; H04Q 2213/04; G06F 13/4027; G06F 13/1668
See application file for complete search history.

(56) References Cited

U.S. PATENT DOCUMENTS

| | | | |
|---|---|---|---|
| 10,733,350 B1 * | 8/2020 | Prasad | G06F 30/396 |
| 2017/0171111 A1 | 6/2017 | Khare et al. | |
| 2021/0303508 A1 * | 9/2021 | Morshed | H04L 49/355 |
| 2022/0101887 A1 * | 3/2022 | Han | G11C 5/025 |

OTHER PUBLICATIONS

Masing, Leonard, "In-NoC circuits for low-latency cache coherence in distributed shared-memory architectures", 2018 IEEE 12th International Symposium on Embedded Multicore/Many-core Systems-on-Chip (8 pages).

Lusala, Angelo Kuti, A Hybrid NoC Combining SDM-Based Circuit Switching with Packet Switching for Real-Time Applications, 2010 IEEE (4 pages).

Postman, Jacob, Swift: A Low-Power Network-On-Chip Implementing the Token Flow Control Router Architecture With Swing-Reduced Interconnects, IEEE Transactions on Very Large Scale Integration (VLSI) Systems, vol. 21, No. 8, Aug. 2013 (15 pages).

* cited by examiner

*Primary Examiner* — Kent Krueger
(74) *Attorney, Agent, or Firm* — Patterson + Sheridan, LLP

(57) ABSTRACT

Embodiments herein describe an integrated circuit that includes a NoC with at least two levels of switching: a sparse network and a non-blocking network. In one embodiment, the non-blocking network is a localized interconnect that provides an interface between the sparse network in the NoC and a memory system that requires additional bandwidth such as HBM2/3 or DDR5. Hardware elements connected to the NoC that do not need the additional benefits provided by the non-blocking network can connect solely to the sparse network. In this manner, the NoC provides a sparse network (which has a lower density of switching elements) for providing communication between lower bandwidth hardware elements and a localized non-blocking network for facilitating communication between the sparse network and higher bandwidth hardware elements.

20 Claims, 6 Drawing Sheets

LOCALIZED NOC SWITCHING INTERCONNECT FOR HIGH BANDWIDTH INTERFACES

TECHNICAL FIELD

Examples of the present disclosure generally relate to adding localized, non-blocking interconnects in a network on chip (NoC) for interfacing with high bandwidth elements.

BACKGROUND

A system on chip (SoC) (e.g., a field programmable gate array (FPGA), a programmable logic device (PLD), or an application specific integrated circuit (ASIC)) can contain a packet network structure known as a network on chip (NoC) to route data packets between logic blocks in the SoC—e.g., programmable logic blocks, processors, memory, and the like.

The NoC can include ingress logic blocks (e.g., primary circuits) that execute read or write requests to egress logic blocks (e.g., secondary circuits). Requirements for on-chip data movement have been increasing since devices now support high bandwidth interfaces like PCIe and high speed IO, and support high bandwidth memory systems such as high bandwidth memory (HBM2/3) or double date rate 5 (DDR5) random access memory (RAM). Integrated circuits can use a hardened NoC to route such high-speed traffic. However, typical NoC structures often do not provide the necessary switch density to efficiently and effectively use memories that require high bandwidth.

SUMMARY

Techniques for operating a sparse network and a non-blocking network in a NoC are described. One example is an integrated circuit that includes a first hardware entity, a second hardware entity, and a NoC providing connectivity between the first and second hardware entities. The NoC includes a sparse network coupled to the first hardware entity and a non-blocking network coupled to the second hardware entity where the non-blocking network provides a localized interface between the sparse network and the second hardware entity.

One example described herein is an integrated circuit that includes a first hardware circuit, a second hardware circuit, and a NoC providing connectivity between the first and second hardware circuits. The NoC includes a sparse network coupled to the first hardware circuit and a non-blocking network coupled to the second hardware circuit where the non-blocking network provides a localized interface between the sparse network and the second hardware circuit.

One example described herein is a method that includes providing a NoC that includes a sparse network and a non-blocking network, receiving data from a first hardware entity at the sparse network in the NoC where an intended destination of the data is a second hardware entity connected to the non-blocking network, transmitting the data through the sparse network to the non-blocking network, and transmitting the data through the non-blocking network to the second hardware entity where the non-blocking network provides a localized interface between the sparse network and the second hardware entity.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
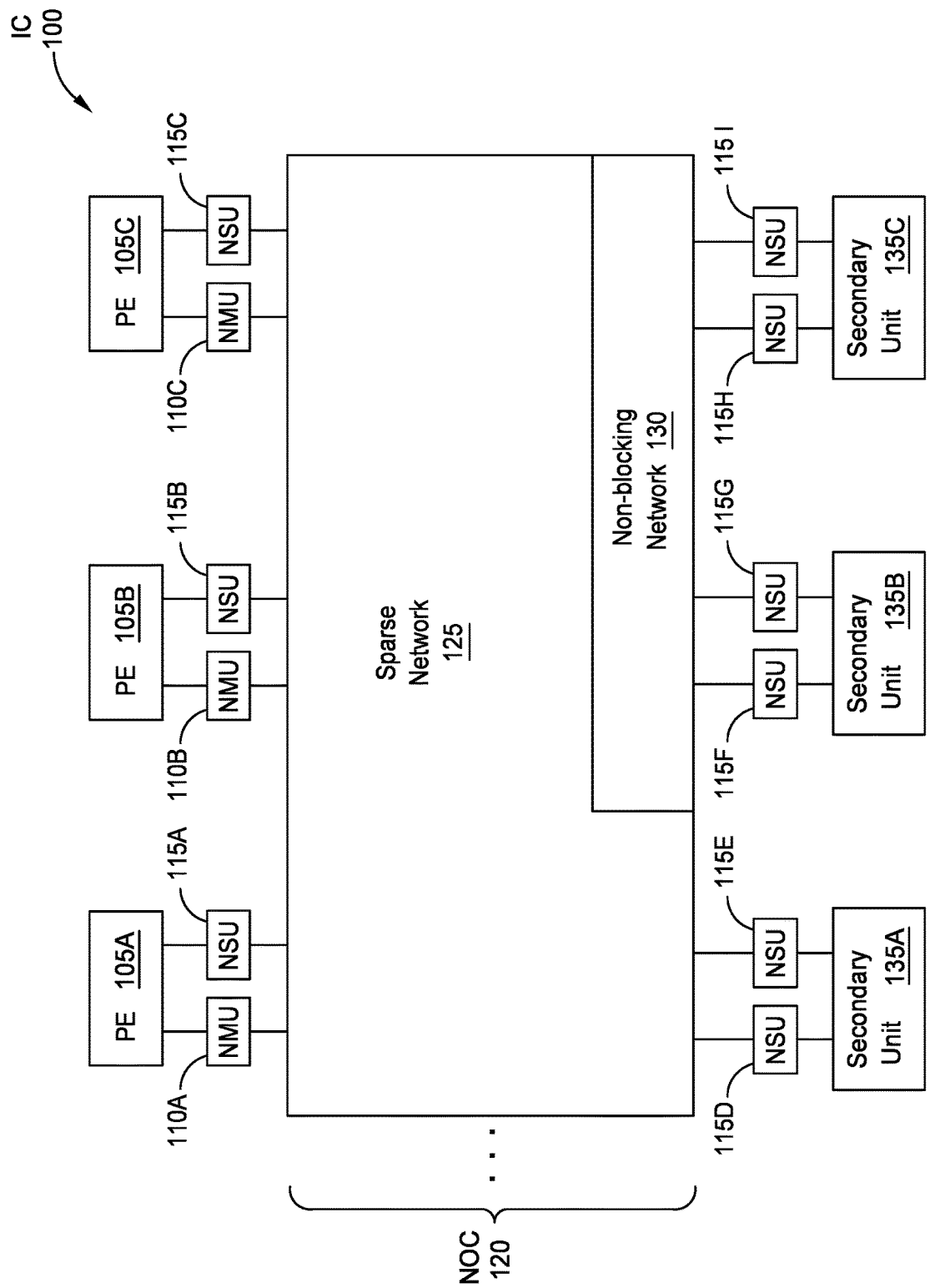
FIG. 1 is a block diagram of an integrated circuit with a NoC that includes a sparse network and a non-blocking network, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe an integrated circuit (e.g., a SoC) that includes a NoC with at least two levels of switching: a sparse network and a non-blocking network. In one embodiment, the non-blocking network is a localized interconnect that provides an interface between the sparse network in the NoC and a memory system that requires additional bandwidth such as HBM2/3 or DDR5. Hardware elements connected to the NoC that do not need the additional benefits provided by the non-blocking network can connect solely to the sparse network. In this manner, the NoC provides a sparse network (which has a lower density of switching elements) for providing communication between lower bandwidth hardware elements and a localized non-blocking network for facilitating communication between the sparse network and higher bandwidth hardware elements.

FIG. 1 is a block diagram of an integrated circuit 100 with a NoC 120 that includes a sparse network 125 and a non-blocking network 130, according to an example. In one embodiment, the IC 100 includes only hardened circuitry in an ASIC. In another embodiment, the IC 100 (e.g., a SoC) includes a mix of hardened and programmable logic. Nonetheless, the NoC 120 may be formed using hardened circuitry rather than programmable circuitry so that its footprint in the IC 100 is reduced.

As shown, the NoC 120 interconnects processing elements (PEs) 105 and secondary units 135. The PEs 105 can include programmable logic blocks or hardened processors. That is, the NoC 120 can be used in the IC 100 to permit different hardened or programmable circuit elements in the IC 100 to communicate. For example, the PE 105A may use one NoC Master Unit 110A (e.g., an ingress logic block) to communicate with the secondary unit 135A. Although as shown being connected to one NMU 110, the PEs 105 can couple to multiple NMUs 110. In either case, in another embodiment, the PE 105A may use the same NMU 110A to communicate with multiple secondary units 135 (assuming these endpoints use the same communication protocol). During configuration, a compiler determines the data paths the PEs 105 use in the NoC 120 to communicate with the secondary units 135 and other PEs 105. That is, the paths may be set before the NoC 120 begins to operate and do not change unless the NoC 120 is reconfigured. Thus, each time the PE 105A transmits data to the secondary unit 135B, it will use the same path through the NoC 120, until the NoC 120 is reconfigured.

To route the data, the NoC 120 includes the sparse network 125 and the non-blocking network 130 which have connections between themselves and the ingress logic blocks (e.g., the NMUs 110) and egress logic blocks (e.g., NoC Slave Units (NSUs) 115). As mentioned above, some hardware elements—e.g., secondary units 135B and 135C such as HBM or DDR5—operate more efficiently at higher bandwidths than other hardware elements. To provide additional benefits to the secondary units 135B and 135C, the NoC includes the non-blocking network 130 that serves as an interface between the secondary units 135B and 135C and the rest of the NoC 120—i.e., the sparse network 125. In one embodiment, the non-blocking network 130 comprises switching elements (e.g., crossbars) that provide full, non-blocking connections between inputs into, and outputs from, the non-blocking network 130. That is, an input into the non-blocking network 130 has access to any output of the non-blocking network 130. In contrast, the sparse network 125 does not guarantee non-blocking input/outputs. As a result, the sparse network 125 may not provide as much bandwidth to the connected PEs 105 and secondary unit 135A as the non-blocking network 130, but the density of the switching elements in the sparse network 125 may be lower which means it may require less area in the IC 100 and have a reduced cost when compared to a non-blocking network.

In FIG. 1, not all the secondary units 135 can efficiently use the additional benefits provided by the non-blocking network 130. For example, the secondary unit 135A may be programmable logic or a slower memory system, while the secondary unit 135B may be a nHBM system and the secondary units 135C is a DDR5 memory system. As shown, the secondary unit 135A is attached to the sparse network 125 while the secondary units 135B and 135C are attached to the non-blocking network 130. Thus, a connection in the NoC 120 between two PEs 105, or between a PE 105 and the secondary unit 135A may be located solely within the sparse network 125. In contrast, a connection between a PE 105 and one of the secondary units 135B or 135C that includes both the sparse network 125 and the non-blocking network 130.

While the NoC 120 can be configured to permit the PEs 105 to communicate with all the other hardware logic blocks that are also connected to the NoC 120, in other embodiments, the PEs 105 may communicate with only a sub-portion of the other hardware logic blocks (e.g., other PEs and the secondary units 135) connected to the NoC 120. For example, for one configuration of the NoC 120, the PE 105A may be able to communicate with the PE 105B but not with the PE 105C, or with only a subset of the secondary units 135. However, the NoC 120 may be reconfigured such that the PE 105A has established communication paths in the NoC 120 with all these hardware elements.

In one embodiment, the IC 100 is an FPGA that configures the PEs 105 according to a user design. That is, in this example, the FPGA includes both programmable and hardened logic blocks. However, in other embodiments, the IC 100 is an ASIC that includes only hardened logic blocks. That is, the IC 100 may not include programmable logic (PL) blocks in which case the PEs 105 are hardened processors or processing circuits. Even though in that example the logic blocks are non-programmable, the NoC 120 may still be programmable to switch between different communication protocols, change data widths at the interface, or adjust its operational frequency.

Figure 2:
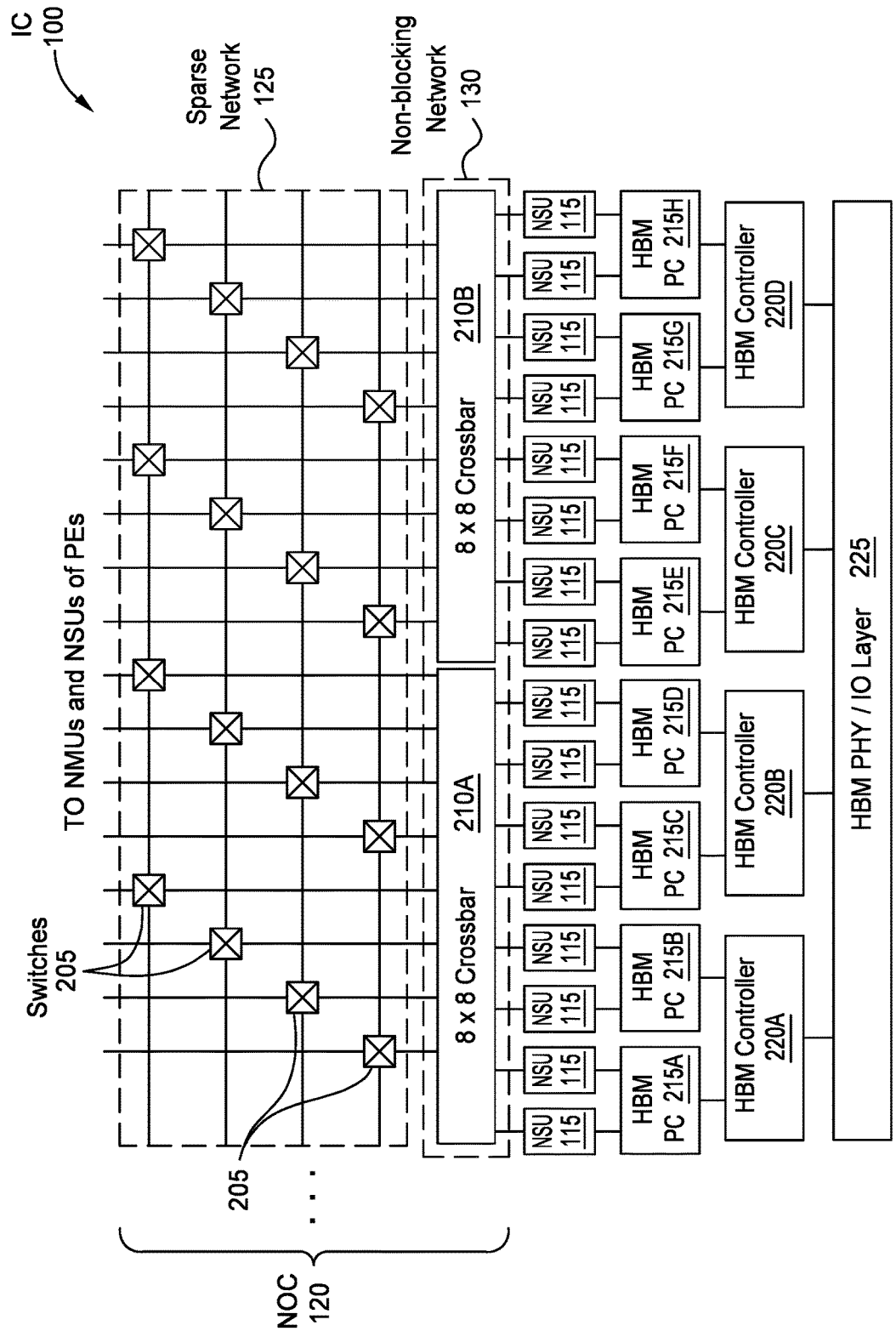
FIG. 2 is a block diagram of an IC with a NoC that includes a localized interconnect for HBM, according to examples.

FIG. 2 is a block diagram of an IC 100 with a NoC 120 that includes a localized interconnect for HBM, according to examples. That is, the non-blocking network 130 serves as a localized interconnect between the rest of the NoC 120 (e.g., the sparse network 125) and the components in the HBM—i.e., HBM pseudo channels (PC) 215, HBM controllers 220, and an HBM physical (PHY) and input/output (I/O) layer 225.

In this example, the sparse network 125 includes a plurality of interconnected switches 205. As mentioned above, these switches may not guarantee non-blocking connections where any input into the sparse network 125 can communicate with any output of the sparse network 125. While this reduces the bandwidth provided by the sparse network 125, it also reduces the cost and footprint of the NoC 120 in the IC 100. For many hardware elements connected to the NoC, the bandwidth provided by the interconnected switches 205 is sufficient.

However, since HBM can benefit from increased bandwidth, the NoC includes the non-blocking network 130 which has 8×8 crossbars 210 for providing a full, non-blocking connection to the HBM PCs 215 (which can also be referred to as HBM PC ports). In this example, each HBM controller 220 has two HBM PCs 215 that share the same address space—i.e., an address space corresponding to the HBM controller 220. The HBM PCs 215 are in turn coupled to respective NSUs 115 which provide access to the non-blocking network 130 of the NoC 120.

In one embodiment, the sparse network 125 and the non-blocking network 130 use the same NoC protocol to transmit data. However, when the data leaves (egresses from) the NoC to an external hardware element (e.g., the HBM PCs 215), the NSUs 115 convert the data from the NoC protocol to the HBM protocol (e.g., an Advanced eXtensible Interface (AXI) protocol such as AXI-memory mapped (AXI-MM)). Another conversion process is performed when data is transferred from a NMU (not shown in FIG. 2) into the NoC 120. For example, the NMUs may convert data from an Advanced eXtensible Interface (AXI) protocol into the NoC protocol.

Figure 3:
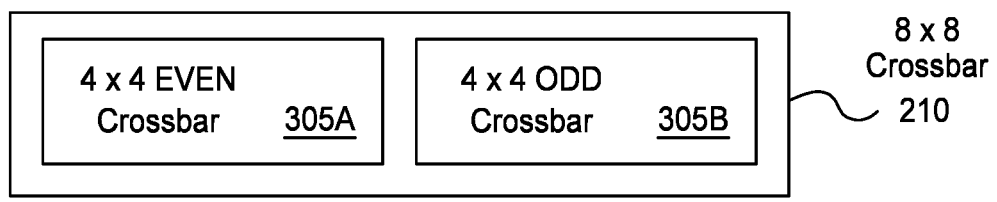
FIG. 3 is a block diagram of the crossbar illustrated in FIG. 2, according to an example.
Figure 4:
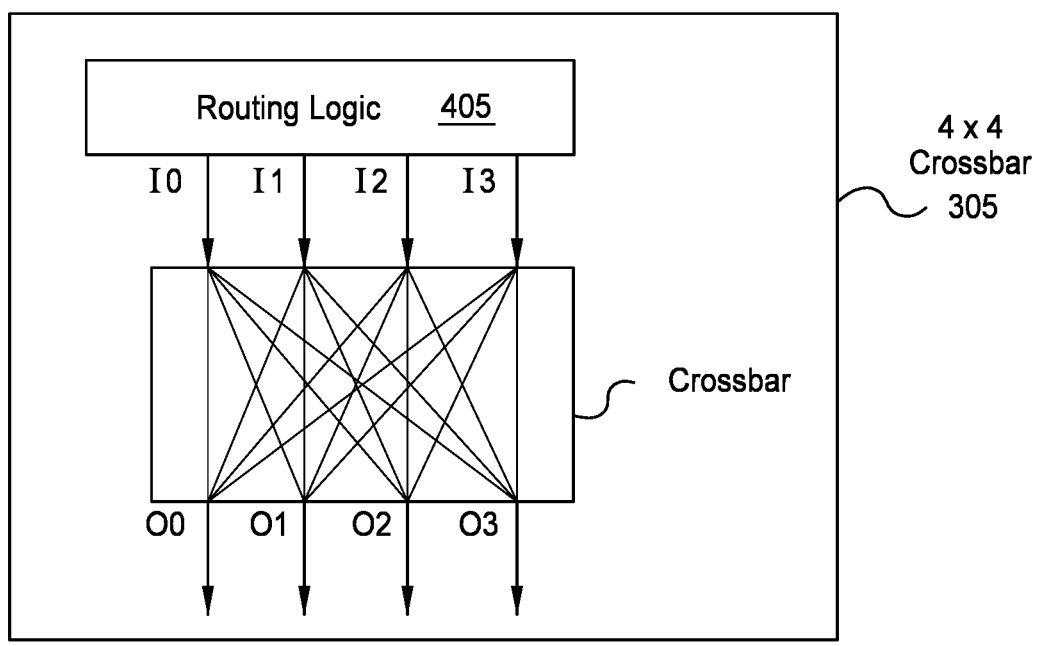
FIG. 4 is a block diagram of the crossbar illustrated in FIG. 3, according to an example.

As shown, the 8×8 crossbars 210 include eight inputs and eight outputs. The crossbars 210 permit data to be transferred from the sparse network 125 into the HBM PCs 215, and eventually into the HBM PHY/IO layer 225. In response, the crossbars 210 also permit data to be transferred from the HBM PCs 215 into the sparse network 125 and eventually to the NMUs and PEs (not shown in FIG. 2). In one embodiment, the 8×8 crossbars 210 are non-blocking so that an input can access all the outputs (or a subset of the outputs as shown in FIGS. 3 and 4). That is, an input may not need to access all of the outputs, in which case the crossbars 210 can be fully non-blocking even if an input does not have the ability to use all eight of the outputs of the crossbar 210.

FIG. 2 only illustrates a portion of an HBM stack. In one embodiment, HBM uses multiple independent memory-controllers which feed into one HBM memory stack. For example, one HBM2E stack can have up to eight HBM controllers 220, each divided into two PCs 215. Each HBM PC 215 is connected to one or two NoC channels to support the desired bandwidth. In one example, HBM2E devices run at 3200 Mbps and each have 16 HBM PCs where each PC can support up to 25.6 GBps of bandwidth. Depending upon the specific NoC frequency, 1-2 channels of 128-bit data in the NoC 120 can be used to sustain HBM PC bandwidth. Moreover, multiple PEs can connect to multiple HBM controllers 220. The crossbars 210 'localize' NoC traffic to respective HBM PCs 215. This allows the sparse network 125 to do the 'heavy-lifting' of traffic routing in the NoC 120 while the localized-crossbars 210 route the traffic to specific locations (i.e., the NSUs 115 coupled to the HBM stack).

That is, the 8×8 switch crossbars 210 localize traffic across eight HBM PCs 215. In one example, each NoC channel is designed to be 128-bit wide (at 1 GHz) in which case two NoC channels can support each HBM PC 215.

FIG. 3 is a block diagram of the 8×8 crossbar 210 illustrated in FIG. 2, according to an example. Here, the 8×8 crossbar 210 is divided into two 4×4 crossbars 305. Specifically, the 8×8 crossbar 210 includes a 4×4 even crossbar 305A and a 4×4 odd crossbar 305B.

Two ports coming out of each HBM PC target the same address. Such ports are defined as 'even' and 'odd' ports and are used for load balancing at an HBM boundary. As such, the 8×8 crossbar 210 can be divided into two true 4×4 crossbars 305 (which can also be referred to as crossbar switches). That is, there is no advantage in this HBM implementation to enable the even ports to communicate with the odd ports, and vice versa. The even crossbar 305A only connects to even ports of the HBM PC and the odd crossbar 305B only to odd ports. This eliminates the need for any horizontal routing/connections between the even and odd crossbars 305. Stated differently, in this implementation of the 8×8 crossbar 210, data does not flow between the crossbars 305. This optimization of the 8×8 crossbar 210 permits the logic in the crossbar 210 to be reduced relative to a 8×8 crossbar implementation where each input can communicate with all eight outputs rather than only the even inputs of the crossbar 305A being able to communicate with the even outputs of the crossbar 305A and the odd inputs of the crossbar 305B being able to communicate with the odd outputs of the crossbar 305B. This may reduce the overall footprint of the 8×8 crossbar 210.

Although the 8×9 crossbar 210 in FIG. 3 is not a "true" crossbar, it is nonetheless a non-blocking crossbar since the inputs do not need to access all eight of the inputs in this HBM example—i.e., the even inputs only need access to the even outputs and the odd inputs only need access to the odd outputs. However, in other embodiments, the 8×8 crossbar may be implemented using a true 8×8 crossbar where each input can access all eight outputs.

The 8×8 crossbar 210 is a static implementation and may not have routing table/address translation logic like the NoC switches in the sparse network portion of the NoC. This means that NoC compiler does not need to route packets until the packets reach the HBM input ports and only routes packets to the best possible location at the input of crossbar switch. The even and odd crossbars 305 append two additional bits to the address information coming from input packets into 8×8 crossbar 310 and routes the packets accordingly. The response data received from the HBM stack follows the same path as through the 8×8 crossbar, using the two bits. The two bits are dropped from the response as the packet comes out of 8×8 crossbar 210 and is routed through the sparse network in the NoC.

FIG. 4 is a block diagram of a crossbar illustrated in FIG. 3, according to an example. That is, FIG. 4 illustrates one implementation of the even and odd crossbars 305 introduced in FIG. 3. FIG. 4 illustrates the non-blocking attribute of the 4×4 crossbar 305 where any input (I0-I3) can access any output (O0-O3). Further, the 4×4 crossbar 305 includes routing logic 405 for appending the two bits in the address information of received packets (either data received from the sparse network, or response data received from the HBM stack) to route the packets through the 4×4 crossbar 305 and out of the 8×8 crossbar 210 in FIG. 3.

The architecture discussed above improves congestion in a hardened NoC for localized HBM traffic and reduces the number of switches required to connect all HBM ports from every NoC physical channel. The connection topology reduces horizontal NoC latency significantly (which is provided by the sparse network), improves power consumption, and improves memory efficiency, specifically in case of HBM interleaved access. This also helps in reducing compiler complexity when configuring the NoC.

Figure 5:
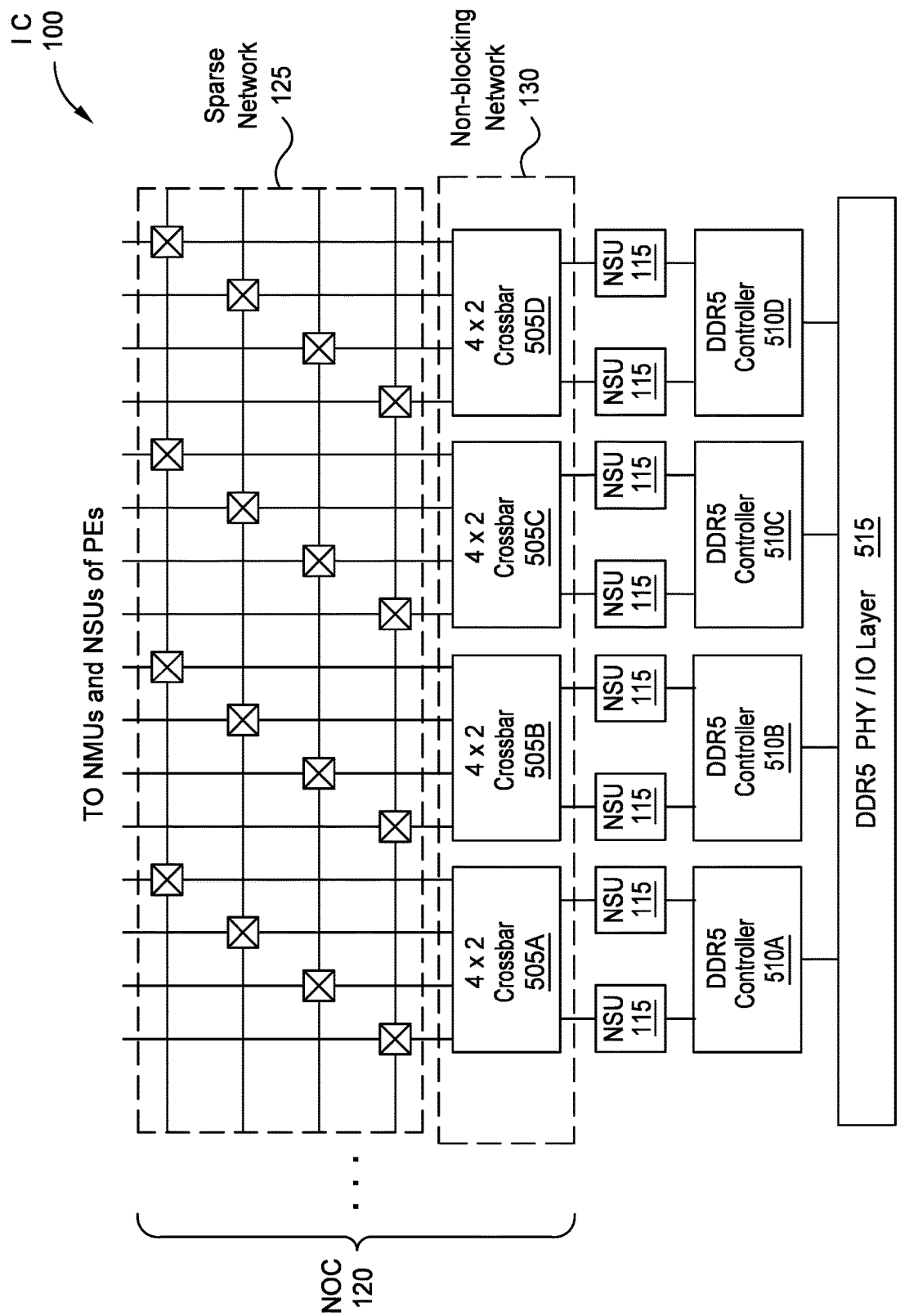
FIG. 5 is a block diagram of an IC with a NoC that includes a localized interconnect for DDR5, according to an example.

FIG. 5 is a block diagram of an IC 100 with a NoC 120 that includes a localized interconnect for DDR5, according to an example. FIG. 5 is similar to FIG. 2 except the non-blocking network 130 is optimized for connecting a DDR5 memory stack rather than an HBM stack. Here, the non-blocking network 130 includes 4×2 crossbars 505 that localize NoC traffic to respective DDR 5 controllers 510 (also referred to as DDR5 controller ports). Like above, this architecture permits the switches 205 in the sparse network 125 to do the heavy lifting of routing data in the NoC 120 while the localized 4×2 crossbars 505 (which can also be referred to as crossbar switches) routes the traffic to the specific NSUs 115 connected to the DDR5 stack.

In FIG. 5, the 4×2 switch crossbar localizes traffic across two DDR5 channels ports. Each DDR5 controller 510 is connected to at least one NSU 115, which translates NoC protocol to, for example, AXI-MM which is used by the DDR5 stack. In one example, each NoC channel is designed to be 128-bit wide (at 1 GHz). Hence two NoC channels support each DDR5 controller 510. The two ports exiting each DDR5 controller 510 may target the same address in x32 mode.

Like the 8×8 crossbar in FIG. 2, in one embodiment, the 4×2 crossbars 505 are a static implementation and do not have routing table/address translation logic like rest the switches 205 in the sparse network 125. This means that NoC compiler does not need to route packets until arriving at the DDR5 input ports and only routes packets to the best possible location at the input of the crossbars 505.

Figure 6:
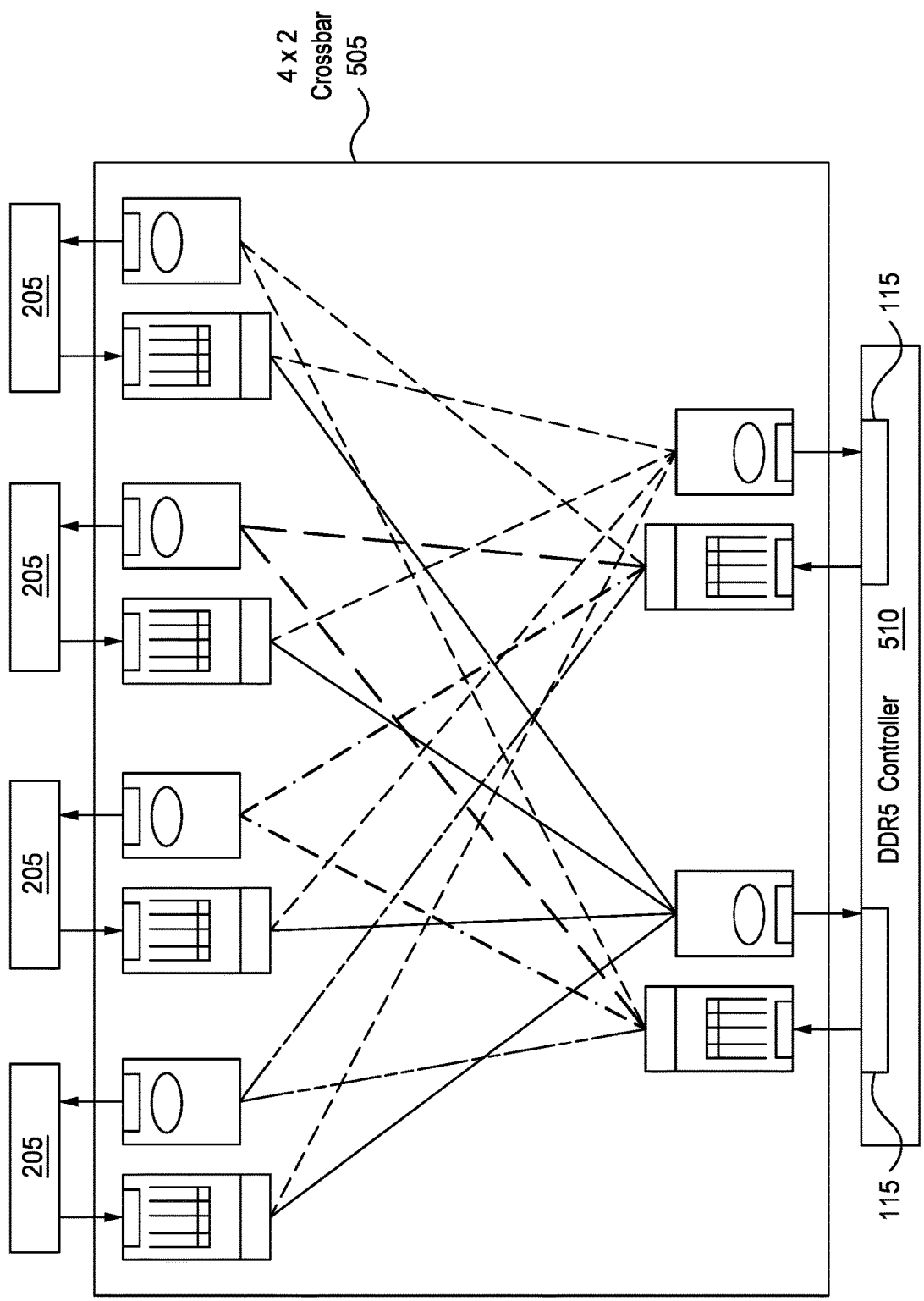
FIG. 6 is a block diagram of the crossbar in FIG. 5, according to an example.

FIG. 6 is a block diagram of the 4×2 crossbar 505 in FIG. 5, according to an example. That is, FIG. 6 illustrates one implementation of the crossbars 505 introduced in FIG. 5. Here, the 4×2 crossbar 505 is optimized for top to bottom traffic and routes the data received from the four NoC Packet Protocol (NPP) switches 205 to either of the two ports of the DDR5 controller 510. The 4×2 crossbar 505 is connected to all four physical channels of the switches 205 in the sparse network, which allows access for x16 mode to each DDR port.

The crossbar 505 can also support virtual channel (VC) requirements for the DDR5 controller 510. There are three levels of request VC priority support: LL (Low Latency), ISOC (Isochronous) and BE (Best Effort).

Instead of a route table lookup, the crossbar 505 can use destination-ID matching to one of the two destination-IDs for DDR ports (corresponding to the two NSUs 115). DDR request tokens can be specified as per five request VCs: LLR/ISR/BER/ISW/BEW. The crossbar 505 can support four request ports with five VCs each, and 3 levels of priority. In contrast, DDR response tokens can be specified as per four response VCs (two response ports with four VCs each, and two levels of priority).

The NoC architecture discussed above can improve congestion on a hardened NoC for localized DDR5 traffic and reduce the number of switches required to connect to all DDR5 ports from every NoC physical channel. The connection topology reduces horizontal NoC latency significantly (in the sparse network), improves power consumption, provides more VC support per DDR port, and improves memory efficiency specifically in case of DDR5 interleaved access. This also helps in reducing compiler complexity when configuring the NoC.

Figure 7:
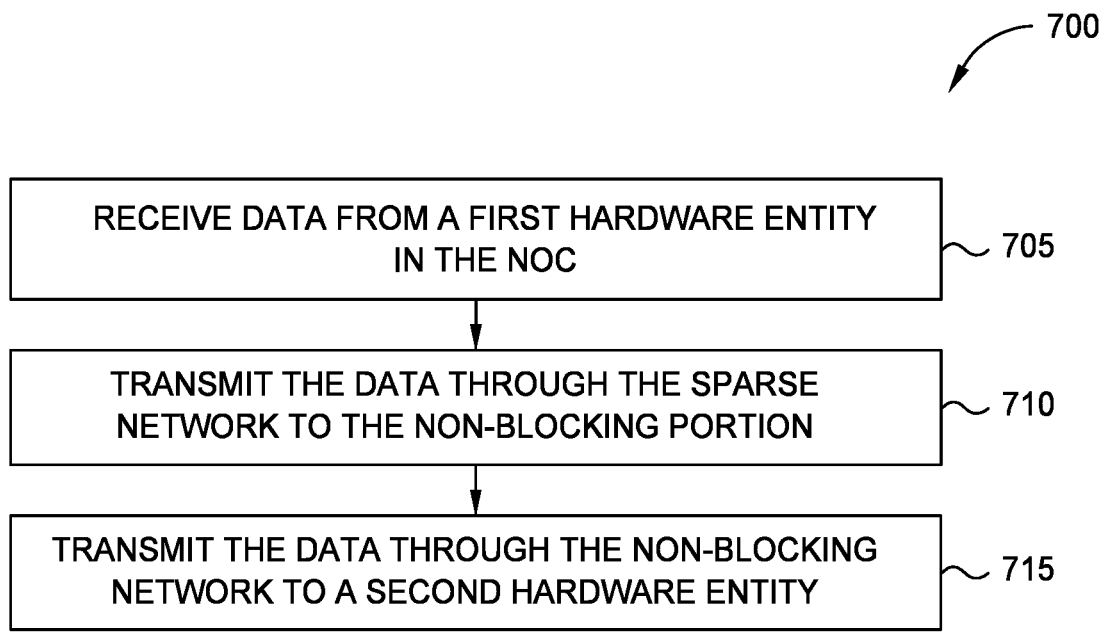
FIG. 7 is a flowchart of a method 700 for transmitting data in a NoC, according to an example.

FIG. 7 is a flowchart of a method 700 for transmitting data in a NoC that includes a sparse network portion and a non-blocking network portion, according to an example. At block 705, the sparse network of the NoC receives data from a first hardware entity. The first hardware entity may be any primary hardware element coupled to the NoC which initiate transactions on the NoC (e.g., the PEs in FIG. 1). The data (e.g., one or more packets) can indicate an intended destination where the NoC should route the data in the form of address information. In one embodiment, the intended destination is a second hardware entity connected to the non-blocking network of the NoC. However, the first hardware entity can also transmit data to other hardware entities coupled to the NoC which can also be coupled to the non-blocking network or can instead be coupled to the sparse network like the first hardware entity.

At block 710, the sparse network transmits the data to the non-blocking network. In one example, the sparse network routes the data using switches and pre-configured routes until the data reaches the non-blocking network in the NoC.

At block 715, the non-blocking network (e.g., one or more crossbars) transmits the data through the non-blocking network to the second hardware entity. That is, the non-blocking network is arranged in the NoC between the second hardware entity and the sparse network. In this manner, the non-blocking network provides a localized interface between the sparse network and the second hardware entity.

The second hardware entity may be a secondary or primary hardware element. In one embodiment, the second hardware entity has greater bandwidth usage than the first hardware entity connected to the sparse network. In one embodiment, the second hardware entity is a memory system such as HBM or DDR5.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

While the foregoing is directed to specific examples, other and further examples may be devised without departing from the basic scope thereof, and the scope thereof is determined by the claims that follow.

What is claimed is:

1. An integrated circuit, comprising:
a first hardware entity;
a second hardware entity; and
a network on chip (NoC) providing connectivity between the first and second hardware entities, the NoC comprising:
a sparse network coupled to the first hardware entity; and
a non-blocking network coupled to the second hardware entity, wherein the non-blocking network provides a localized interface between the sparse network and the second hardware entity.

2. The integrated circuit of claim 1, wherein the non-blocking network comprises at least one non-blocking crossbar, wherein the sparse network does not guarantee non-blocking communication.

3. The integrated circuit of claim 2, wherein the non-blocking network comprises a plurality of non-blocking crossbars each coupled to the sparse network.

4. The integrated circuit of claim 2, wherein the sparse network comprises a plurality of interconnected switches, wherein the at least one non-blocking crossbar is coupled to at least two of the plurality of interconnected switches.

5. The integrated circuit of claim 2, wherein the at least one non-blocking crossbar is connected to multiple egress logic blocks, which are in turn connected to multiple high bandwidth memory (HBM) pseudo channels (PC).

6. The integrated circuit of claim 5, wherein the at least one non-blocking crossbar is an 8×8 crossbar that includes two 4×4 crossbars representing even and odd channels of the HBM PCs, wherein each input of the two 4×4 crossbars can access each output of the respective 4×4 crossbar.

7. The integrated circuit of claim 2, wherein the at least one non-blocking crossbar is connected to multiple egress logic blocks, which are in turn connected to a same double data rate 5 (DDR5) memory controller.

8. The integrated circuit of claim 7, wherein the at least one non-blocking crossbar is a 4×2 crossbar, where each of the four inputs into the 4×2 crossbar can access each of the two outputs of the 4×2 crossbar.

9. The integrated circuit of claim 1, wherein the sparse network provides a first connection to the first hardware entity that has less bandwidth than a second connection the non-blocking network provides to the second hardware entity.

10. The integrated circuit of claim 1, further comprising:
a third hardware entity external to the NoC but connected to the sparse network, wherein the first and second hardware entities are configured to communicate to each other using the sparse network but without using the non-blocking network.

11. An integrated circuit, comprising:
a first hardware circuit;
a second hardware circuit; and a network on chip (NoC) providing connectivity between the first and second hardware circuits, the NoC comprising:
- a sparse network coupled to the first hardware circuit; and
- a non-blocking network coupled to the second hardware circuit, wherein the non-blocking network provides a localized interface between the sparse network and the second hardware circuit.

12. The integrated circuit of claim 11, wherein the non-blocking network comprises at least one non-blocking crossbar, wherein the sparse network does not guarantee non-blocking communication.

13. The integrated circuit of claim 12, wherein the non-blocking network comprises a plurality of non-blocking crossbars each coupled to the sparse network.

14. The integrated circuit of claim 12, wherein the sparse network comprises a plurality of interconnected switches, wherein the at least one non-blocking crossbar is coupled to at least two of the plurality of interconnected switches.

15. The integrated circuit of claim 12, wherein the at least one non-blocking crossbar is connected to multiple egress logic blocks, which are in turn connected to multiple high bandwidth memory (HBM) pseudo channels (PC).

16. The integrated circuit of claim 15, wherein the at least one non-blocking crossbar is an 8×8 crossbar that includes two 4×4 crossbars representing even and odd channels of the HBM PCs, wherein each input of the two 4×4 crossbars can access each output of the respective 4×4 crossbar.

17. The integrated circuit of claim 12, wherein the at least one non-blocking crossbar is connected to multiple egress logic blocks, which are in turn connected to a same double data rate 5 (DDR5) memory controller.

18. The integrated circuit of claim 17, wherein the at least one non-blocking crossbar is a 4×2 crossbar, where each of the four inputs into the 4×2 crossbar can access each of the two outputs of the 4×2 crossbar.

19. The integrated circuit of claim 11, wherein the sparse network provides a first connection to the first hardware circuit that has less bandwidth than a second connection the non-blocking network provides to the second hardware circuit.

20. A method, comprising:
- providing a NoC that comprises a sparse network and a non-blocking network;
- receiving data from a first hardware entity at the sparse network in the NoC, wherein an intended destination of the data is a second hardware entity connected to the non-blocking network;
- transmitting the data through the sparse network to the non-blocking network; and
- transmitting the data through the non-blocking network to the second hardware entity, wherein the non-blocking network provides a localized interface between the sparse network and the second hardware entity.

* * * * *